Patented Nov. 7, 1922.

1,434,514

UNITED STATES PATENT OFFICE.

JOHN WALSH, OF PRIDES CROSSING, MASSACHUSETTS.

COMPOSITION FOR COATING GLASS.

No Drawing. Application filed January 16, 1922. Serial No. 529,717.

*To all whom it may concern:*

Be it known that I, JOHN WALSH, a citizen of the United States, residing at Prides Crossing, in the county of Essex and State of Massachusetts, have invented new and useful Improvements in Compositions for Coating Glass, of which the following is a specification.

This invention relates to an improved composition for coating glass and is particularly adapted and intended to be used for coating the glass of greenhouses.

The requirements for a practical composition for this purpose are as follows:—It is desirable that the same should be capable of being easily and quickly applied over a large surface and which will dry quickly, and after having dried will not be cracked by the intense heat of the sun's rays in the summertime and will not be removed by rain, and which will allow the necessary amount of light to pass through, in order that the plants, flowers, and the like, in the greenhouse may be developed under the most favorable conditions.

It is further very desirable in a composition of this character that it should be capable of being easily removed from the surface of the glass when so desired, as in the wintertime it is very desirable that all the light from the sun's rays may be allowed to pass through the glass in order that the flowers and plants in the greenhouse may thrive. The composition of this invention fulfills all of these requirements. It can be applied either with a brush, or can be sprayed upon the surface of the glass; it has been thoroughly tested and has been found when placed on the outside of the glass of the greenhouse it does not crack or peel off under the action of the sun's rays; that it is not washed off by rain and yet that it is capable of being easily removed by rubbing the same with a dry cloth.

The invention consists in the composition containing the ingredients set forth in the following specification and particularly of the ingredients and proportions of ingredients set forth in the claims.

The composition is made by compounding white lead, linseed oil and gasoline, and this composition may be thinned slightly, if so desired, by adding thereto turpentine. The composition is made in the following manner and in the following proportions:—25 pounds of white lead, 1 gallon of linseed oil and 5 gallons of gasoline are placed in a paint mixing machine well known to those skilled in the art of mixing paints, and the ingredients thoroughly mixed together for about twenty-four hours, the resulting composition is then placed in cans and sealed. If, upon opening the cans for use, the composition has thickened more than is desirable for the purpose for which it is to be used, it can be thinned with a small amount of turpentine in the proportion of a half-pint to the amount of ingredients used, as hereinbefore set forth.

The resulting compound has been found, by practical use, to be efficacious for the purpose for which it is intended. It can be spread upon the glass with a brush, or sprayed upon the glass as may be desired and when applied to the glass, especially if a thin coat is applied, the glass takes on the appearance of ground glass.

I claim:—

1. A composition for coating glass comprising the ingredients and in substantially the proportions as follows:—25 pounds of white lead; 1 gallon of linseed oil and 5 gallons of gasoline thoroughly mixed together.

2. A composition for coating glass comprising the ingredients and in substantially the proportions as follows:—25 pounds of white lead; 1 gallon of linseed oil, 5 gallons of gasoline and ½ pint of turpentine thoroughly mixed together.

In testimony whereof I have hereunto set my hand in presence of two subscribing witnesses.

JOHN WALSH.

Witnesses:
FRANKLIN E. LOW,
HAZEL F. LA MUDGE.